United States Patent Office 2,826,573
Patented Mar. 11, 1958

2,826,573

MONOACID SALTS OF ARALKYL POLYAMINES AND METALLIZED MONOAZO DYESTUFFS

Albert F. Strobel, Phillipsburg, N. J., and William W. Williams, Easton, Pa., assignors to General Aniline & Film Corporation, New York, N. Y., a corporation of Delaware No Drawing. Application October 2, 1953
Serial No. 383,926

6 Claims. (Cl. 260—147)

This invention relates to monoacid salts of aralkyl polyamines and monoazo dyestuffs which are metallized with chromium or cobalt in such manner that the dye-metal complex contains 2 molecules of dye for each atom of chromium or cobalt.

It is known that organic dyestuffs, containing as a water soluble substituent, either a sulfonic acid or a carboxylic acid group, or both, can be rendered soluble in organic solvents such as, alcohol, acetone, etc. by converting the water soluble group into a salt with an organic amine. While such dyes are soluble in organic solvents, they are not, however, completely insoluble in water. Most of them are partially or sparingly soluble in water. This solubility is highly undesirable because it leads to water-bleeding. The latter phenomenon is readily observed when such solvent solubilized dyestuffs are incorporated into nitrocellulose or vinyl lacquers, and the lacquer films exposed to wet treatment, such as water or rain. After such treatment the dyestuff or color bleeds from the lacquer film. Such lacquer coatings cannot be applied to tin foil used on for example, milk bottle caps, where the foil might come in contact with the milk.

We have found that when monoacid salts of N,N'-dibenzyl-N,N'-dialkyl alkylenediamines or N,N''-dibenzyl-N,N',N''-trialkyldialkylene triamines and metallized monoazo dyestuffs devoid of sulfonic acid or carboxylic acid groups, which are metallized with chromium or cobalt in such manner that the dye-metal complex contains 2 molecules of dye for each atom of chromium or cobalt, are incorporated into lacquers, and the films of such lacquers exposed to or brought in contact with water, no water-bleeding occurs. The water insoluble monoacid dibenzyl polyamine salts of the metallized monoazo dyes are very soluble in alcohol, acetone, i. e. the usual lacquer solvents including various prepared lacquers. Because of their great solubility in lacquer solvents, the resulting lacquers from the monoacid amine salts possess greater tinctorial strength than the sodium salts of such metal-dye complexes.

While the formation of the metal complex increases the alcohol or acetone solubility of the dye, the polyamine monoacid salt formation further increases the solubility of the dye in lacquer solvents, the compounds of the present invention are outstanding in the great depths of shade which can be obtained in the lacquers.

We have also found that the monoacid polyamine salts of the metal complexes have greater alcohol and ketone solubility than the monoacid monoamine or polyamine salts of sulfonated (unmetallized) dyes.

The foregoing dyes are prepared by boiling 1 mole of the sodium salt of the metal lake of an o,o¹-dihydroxy-monoazo dye in a large volume of water with 1 mole of N,N'-dibenzyl-N,N'-dialkyl ethylenediamine or 1 mole of N,N''-dibenzyl-N,N',N''-trialkyl-dialkylene triamine to which acetic acid has been added. The amine salt of the dye precipitates shortly after adding the acetic acid solution of the diamine or triamine and is filtered and dried.

As an alternative method, the free acid form of such a metallized monoazo dye is dissolved in acetone. To the acetone solution the theoretical quantity of the diamine or triamine is added and then the acetone evaporated. The monoacid amine salt of the metallized monoazo dyestuff is obtained upon evaporation to dryness.

Detailed methods of preparing and applying these new coloring materials for nitrocellulose and vinyl lacquers will appear hereinafter.

Another method of application of these compounds is to prepare the monoacid amine salt of the dyestuff in the lacquer itself by adding the diamine or triamine to the lacquer in solution in alcohol or acetone, and then adding to the lacquer solution the acid form of the metallized monoazo dye. In such an application an excess of the diamine or triamine in the lacquer solution would have no deleterious effect.

The monoazo dyestuffs employed in the preparation of monoacid amine salts are characterized by the following general formula:

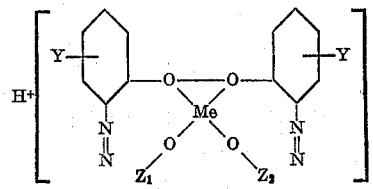

wherein Y represents a radical selected from the class consisting of hydrogen, lower alkyl, e. g., methyl, ethyl, propyl, isopropyl, butyl, isobutyl, etc., cyano and nitro radicals, and $Z_1$ and $Z_2$ represent coupling components, free of carboxylic or sulfonic acid groups, consisting of phenols, naphthols, or enolizable keto compounds which contain an —OH group in ortho or alpha position to the azo bridge after coupling and before forming the metal-dye complex. While $Z_1$ and $Z_2$ are usually the same, they may be different.

As illustrative examples of the phenols, naphthols and enolizable keto compounds, the following may be mentioned:

Phenols:
    p-Tertiarybutylphenol
    p-Cresol
    Resorcinol
    m-Diethylaminophenol
    3-acetylamino-4-methylphenol
    3-acetylamino-4-tertiarybutylphenol
    3,4-dimethylphenol
    2-tetralol
Naphthols:
    2-naphthol
    3-sulfamyl-1-naphthol
    6-sulfamyl-2-naphthol
    2,8-dihydroxy-6-sulfamyl-naphthalene
    4-methyl-1-naphthol
    4-methoxy-1-naphthol
Enolizable keto compounds:
    Acetoacetanilide
    2,4-dihydroxy-quinoline
    N-methyl-2,4-dihydroxy-quinoline
    2-chloro-acetoacetanilide
    1-phenyl-3-methyl-5-pyrazolone
    1-(3'-sulfamylphenyl)-3-methyl-5-pyrazolone
    1-(3'-methylsulfonylphenyl)-3-methyl-5-pyrazolone There is a large class of free acids and sodium salts of such dye-metal complexes and no difficulty will be encountered by those skilled in the art in making the proper selection from the foregoing description.

The following is merely illustrative of such dye complexes which may be employed in accordance with the present invention:

I. Chrome complex of 4-(4'-nitro-2'-hydroxyphenyl-azo)-3-methyl-1-phenyl-5-pyrazolone (chrome complex of the azo dye resulting from the diazotization of 5-nitro-2-aminophenol and coupled to 1-phenyl-3-methyl-5-pyrazolone).

II. Chrome complex of 4-(2'-carboxyphenylazo)-3-methyl-1-phenyl-5-pyrazolone (chrome complex of the azo dye resulting from the diazotization of anthranilic acid and coupled to 1-phenyl-3-methyl-5-pyrazolone).

III. Cobalt complex of 2-[4'-nitro-2'-hydroxyphenyl-azo]-2-acetoacetanilide (cobalt complex of the azo dye resulting from the diazotization of 5-nitro-2-aminophenol and coupled to acetoacetanilide).

IV. Cobalt complex of 1-[4'-nitro-2'-hydroxyphenyl-azo]-2-hydroxy-naphthalene (cobalt complex of the azo dye resulting from the diazotization of 5-nitro-2-aminophenol and coupled to β-naphthol).

V. Chrome complex of 1-[4'-nitro-2'-hydroxyphenyl-azo]-2-hydroxy-naphthalene (chrome complex of the azo dye resulting from the diazotization of 5-nitro-2-aminophenol and coupled to β-naphthol).

VI. Chrome complex of 1-[3'-5'-dinitro-2'-hydroxyphenylazo]-2-hydroxy tetralin (chrome complex of the azo dye resulting from the diazotization of picramic acid and coupled to β-tetralol).

The N,N'-dibenzyl-N,N'-dialkyl ethylenediamines (1) and N,N''-dibenzyl-N,N',N''-trialkyl-diethylene triamines (2) which are utilized for the salt formation are characterized by the following general formula:

(1) 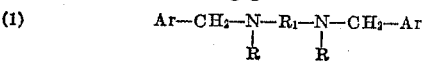

(2) 

wherein Ar is a substituted or unsubstituted phenyl type radical, i. e., phenyl, alkylphenyl, e. g., tolyl, ethylphenyl, butylphenyl and the like, halogenophenyl, e. g. chlorophenyl bromophenyl, dichlorophenyl, dibromophenyl, etc., alkoxyphenyl, e. g., anisyl, ethoxyphenyl, propoxyphenyl, etc., carbalkoxyphenyl, e. g., carbomethoxyphenyl carbethoxyphenyl, carbopropoxyphenyl, etc., aryloxyphenyl, e. g., phenoxyphenyl, methlyphenoxyphenyl etc., cyanophenyl, etc.; R is an aliphatic radical, i. e. alkyl such as methyl, ethyl, propyl, butyl, amyl, hexyl, heptyl and the like; alkenyl, such as allyl, crotyl, 1-methyl-3-butenyl, hexenyl and the like; alkoxyalkyl, i. e. ethoxymethyl, methoxyethyl, methoxypropyl, ethoxyethyl and the like; hydroxyalkyl, i. e., hydroxymethyl, hydroxyethyl, hydroxypropyl, hydroxybutyl, etc.; cyanoalkyl, i. e., cyanomethyl, cyanoethyl, cyanopropyl and the like, carbalkoxyalkyl, i. e., carbomethoxymethyl, carbethoxymethyl, carbopropoxymethyl, carbethoxyethyl and the like; and $R_1$ represents an alkylene group, i. e., any aliphatic open chain linking component, such as methylene, ethylene, trimethylene, propylene and the like. It is to be noted, however, that the aliphatic radical represented by R should be free from halogen and solubilizing groups, e. g. carboxyl, sulfo, and the like.

The N,N'-dibenzyl-N,N'-dialiphatic ethylene diamines, which may be employed in accordance with the present invention are enumerated in columns 3 and 4 of U. S. P. 2,539,212. The N,N''-dibenzyl-N,N',N''-trialkyl-dialkylene triamines including the various species thereof are disclosed in U. S. P. 2,619,502.

By reference to the foregoing patents, one skilled in this art will have no difficulty in selecting the proper polyamines, all of which may be successfully utilized in preparing the final dyes.

In the monoacid salts of aralkyl polyamines and monoazo dyestuffs prepared in accordance with the present invention the salt linkage occurs between the metal complex and the amine. Our monoacid aralkylated polyamine salts, which involve only one amino group of the polyamine, are preferable to salts of metals, such as sodium and potassium or to salts of monoamines, such as for example, dicyclohexylamine, diamylamine and the like, because of the greater solubility of the aralkylated polyamine salts in various types of solvents employed in the preparation of lacquers over the monoamine salts. In addition, our salts exhibit an unusually high degree of alcohol and ketone solubility. This high solubility is a prerequisite for obtaining heavy shades in nitrocellulose and vnyl lacquer coatings. Thus, by preparing the monoacid amine salts of these metal lacquers, both desirable features of coloring matters for nitrocellulose and vinyl lacquer are obtained together with complete insolubility in water.

The following examples which are merely illustrative will show how the present invention may be practiced.

*Example 1*

The dye consists of the monoacid amine salt of N,N'-dibenzyl-N,N'-dimethyl ethylenediamine with the free acid form of the dye Azosol Fast Red BE.

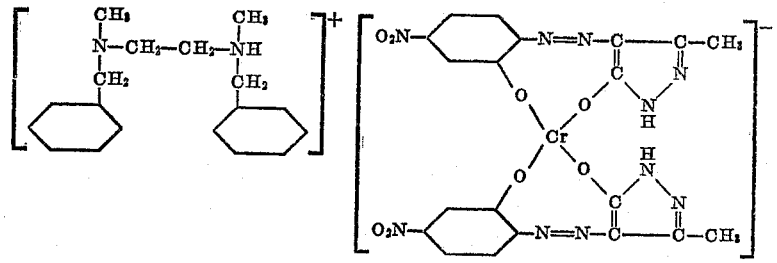

22.40 grams of the free acid form of the chrome complex of 5-nitro-2-aminophenol-3-methyl-5-pyrazolone were dissolved in 100 ml. of acetone. Then there were added 75 ml. of 0.5 N sulfuric acid. To this mixture 200 ml. of water were added, and the mixture heated until the acetone was evaporated. The material was filtered and washed with water. The presscake was added to a mixture of 10.4 grams of N,N'-dibenzyl-N,N'-dimethyl ethylenediamine in 100 ml. of acetone. The material was stirred over a steam bath and allowed to evaporate. After all the acetone had evaporated, a small amount of moisture remained. The product was filtered and dried in a vacuum oven at 75° C.

It is to be noted that the depth of shade will vary with the amount of dye pigment used. This amount may range from 100–400 mg. in the following compositions: 100 mg. of the dye of the foregoing example was treated with 10 cc. of methanol and 15 cc. of nitrocellulose thinner consisting of 30 parts of toluene, 45 parts of ethanol, and 25 parts of ethyl acetate. The mixture was shaken for 10 minutes on a shaking machine and 40 grams of nitrocellulose lacquer consisting of 67½ parts of nitrocellulose solution prepared as will be hereinafter described. 19 parts of glyptal solution in 7.7 parts of dibutyl phthalate, and 5.8 parts of n-butanol were added, and shaking continued for 15 minutes. The resultant solution was coated on aluminum foil and also on white clay coated paper bearing the name Krome Kote, using a Bird Film Applicator so adjusted as to form a film of wet lacquer 0.003 inch thick. The drawdowns were allowed to dry in air, after which they were tested for strength, shade, light fastness, water-bleeding fastness, etc.

The nitrocellulose solution utilized above, consisted of the following ingredients:

| | Pts. by wt. |
|---|---|
| Nitrocellulose, ½ sec | 40 |
| Ethanol | 21.5 |
| Ethyle acetate | 23 |
| Butyl acetate | 9.6 |
| Butyl alcohol | 5.8 |

The monoacid N,N'-dibenzyl-N,N'-dimethyl ethylenediamine salt of the free acid form of the metallized dye (chrome complex of the azo dye resulting from diazotization of 5-nitro-2-aminophenol and coupling to 1-phenyl-3-methyl-5-pyrazolone showed no water-bleeding whatsoever, whereas the sodium salt of the free acid form of the same dye showed considerable water-bleeding.

*Example 2*

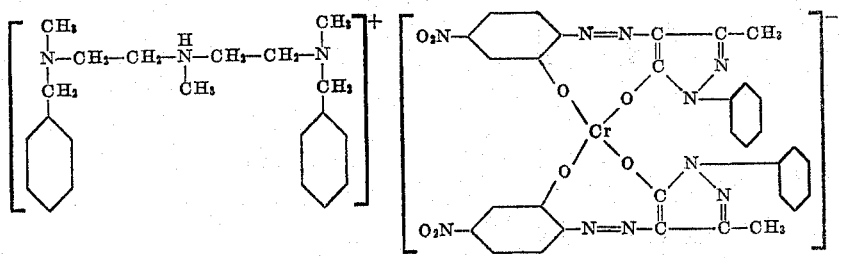

28.6 grams of the free acid form of the metal-dye lake, were slurried with 100 ml. of acetone. To this slurry was added 12.7 grams of N,N''-dibenzyl-N,N',N''-trimethyl diethylenetriamine.
The material was warmed on the steam bath until the acetone was completely evaporated, whereupon the desired dye was obtained in the form of a hard, dry mass. The material was ground and thoroughly dried in an air-oven at 90° C. to give 32.0 grams of dry dye.

Application of the dye of Example 2 and of all succeeding examples was carried out in the same manner as that of the dye of Example 1. The monoacid N,N',N''-trimethyl-N,N''-dibenzyl diethylenetriamine salt of the metallized dye showed essentially no water-bleeding while the sodium salt of the same dye showed considerable water-bleeding.

*Example 3*

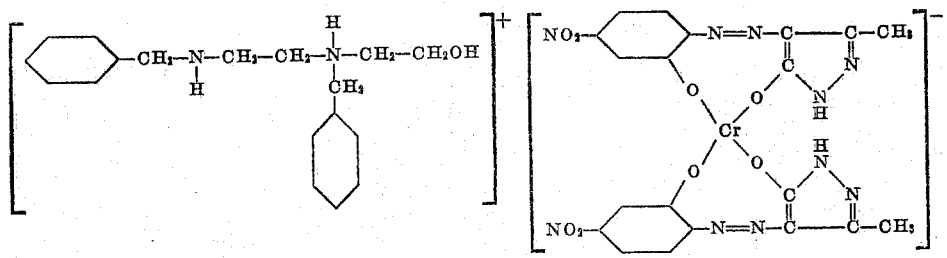

Example 1 was repeated with the exception that 10.4 grams of N,N'-dibenzyl-N,N'-dimethyl ethylenediamine were replaced by 11.04 grams of N,N'-dibenzyl-(N-hydroxyethyl)ethylenediamine.

The application of this dye was carried out as in Example 1 with the same results.

*Example 4*

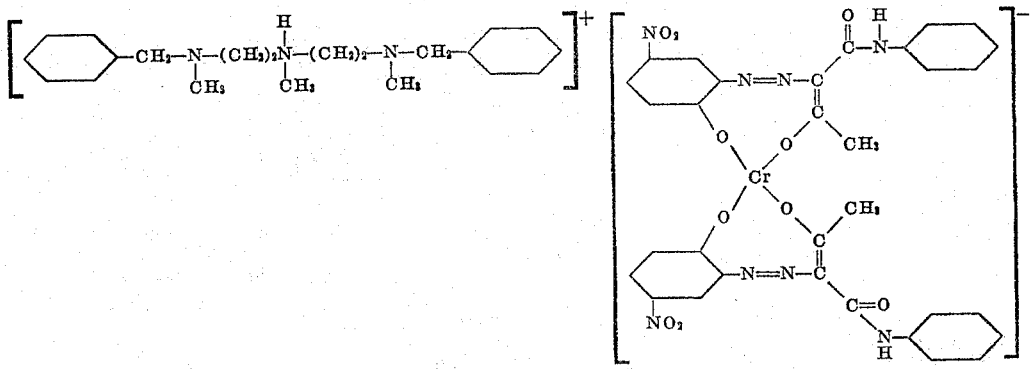

28.3 grams of the sodium salt of the chrome complex of the dye: 4-nitro-2-aminophenol→acetoacetanilide were dissolved in 100 ml. of acetone. To this material were added 74.2 ml. of 0.5 N sulfuric acid and 10.4 grams of N,N''- dibenzyl - N,N',N''- trimethyl diethylenetriamine.

The acetone solution was evaporated to dryness on the steam bath, and the product dried in an air oven, ground and tested as in Example 1. The same results were obtained.

*Example 5*

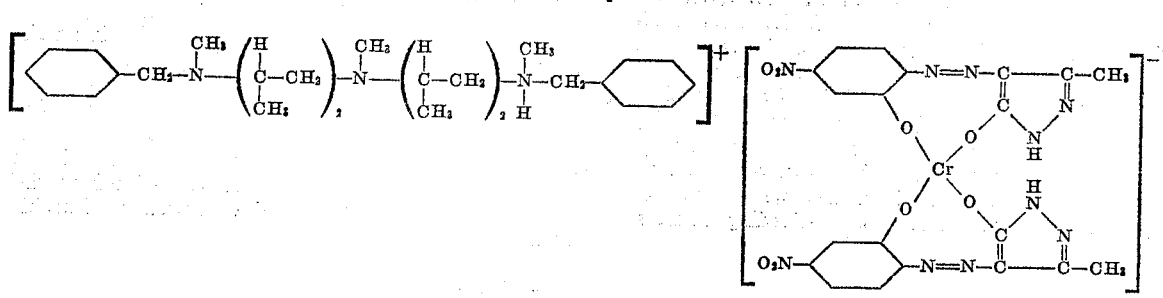

100 mg. of the free acid form of the chrome complex of the dye: 5-nitro-2-aminophenol→3-methyl-5-pyrazolone and 70 mg. (50% excess over theory) of N,N''-dibenzyl-N,N',N''-trimethyl-di-(1,2-propylene)-triamine were added to 10 cc. of methanol and the material incorporated into the nitrocellulose lacquer exactly as in the application of the dye in Example 1. The same results were obtained as in the previous examples.

Lacquers other than those mentioned may be used with the dyes in question, i. e., lacquers containing cellulose esters, such as cellulose formate, cellulose propionate, cellulose butyrate, cellulose-acetate-propionate, cellulose-acetate-butyrate, or cellulose ethers, such as cellulose methyl ether, cellulose ethyl ether, cellulose benzyl ether and the like, including the usual vinyl resin lacquers.

wherein Ar is a phenyl radical, R is a lower aliphatic radical, $R_1$ is a lower alkylene radical, Me represents a trivalent metal ion selected from the group consisting of chromium and cobalt, Y represents a radical selected from the class consisting of hydrogen, lower alkyl, cyano and nitro radicals, and $Z_1$ and $Z_2$ represent residues of coupling components of which the formulae are $Z_1$—OH and $Z_2$—OH, said residues being free of carboxylic and sulfonic groups and selected from the class consisting of phenols and naphthols containing a phenolic —OH group in ortho position to the azo bridge after coupling and prior to the formation of the metal-dye complex, and enolizable keto compounds containing an enolic —OH group attached to the carbon atom in ortho position to the carbon atom bearing the azo group after coupling and prior to the formation of the metal-dye complex.

2. A metallized monoazo dyestuff characterized by the following formula:

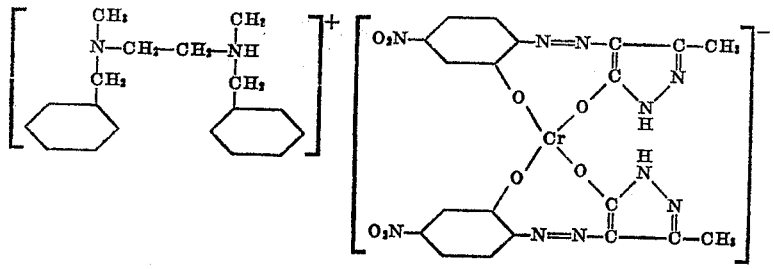

We claim:
1. Metallized monoazo dyestuffs selected from the class consisting of those having the following formulae:

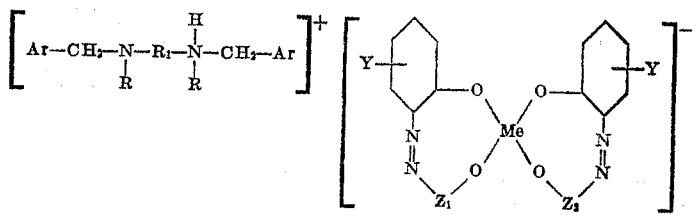

and

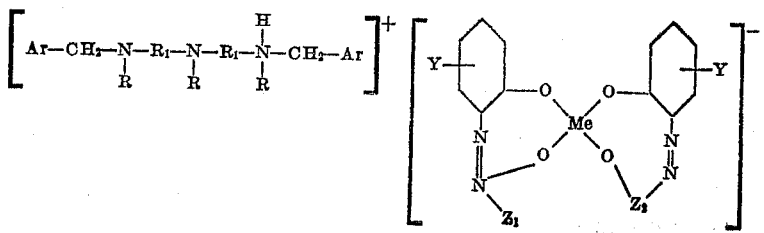

3. A metallized monoazo dyestuff characterized by the following formula:

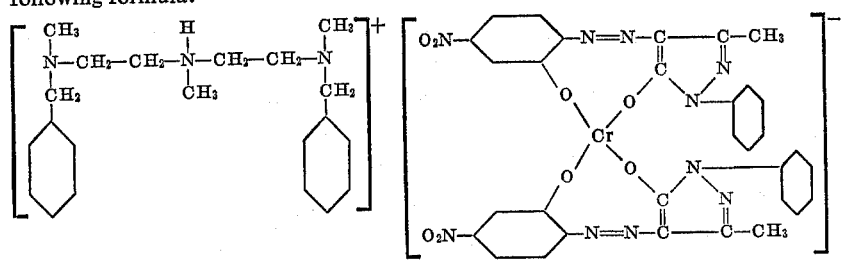

4. A metallized monoazo dyestuff characterized by the following formula:

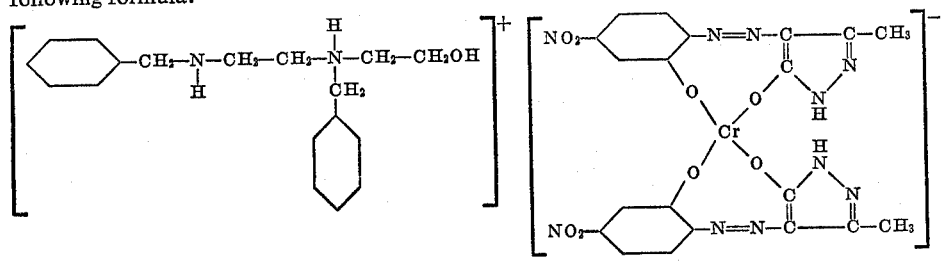

5. A metallized monoazo dyestuff characterized by the following formula:

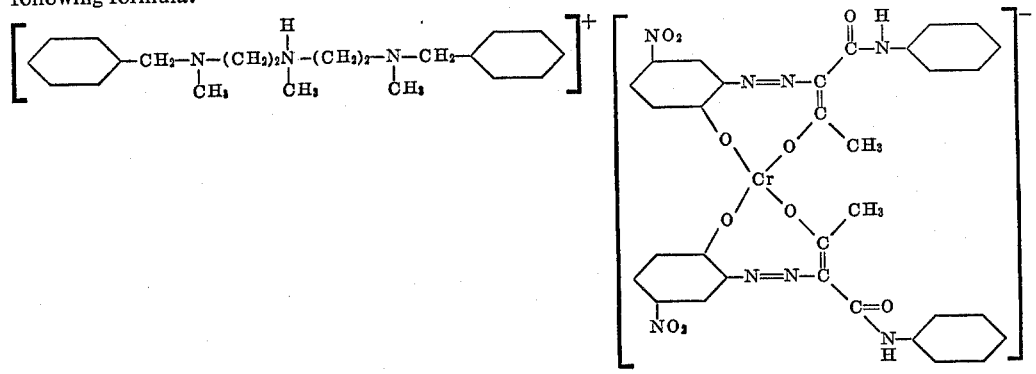

6. A metallized monoazo dyestuff characterized by the following formula:

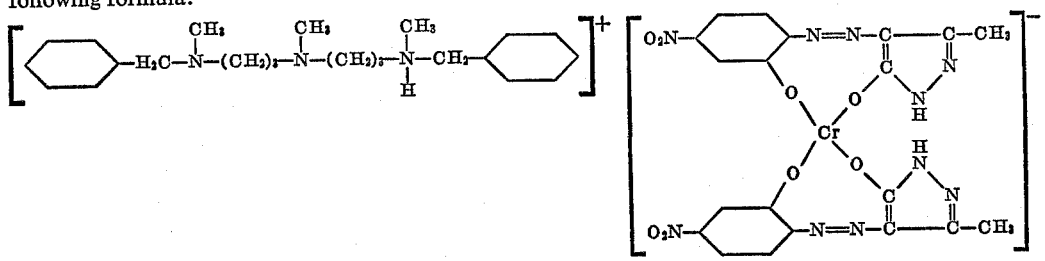

References Cited in the file of this patent

UNITED STATES PATENTS

| | | |
|---|---|---|
| 1,800,300 | Kranzlein | Apr. 14, 1931 |
| 2,038,298 | Kiernan | Apr. 21, 1936 |
| 2,215,105 | Krzikalla | Sept. 17, 1940 |
| 2,539,212 | Strobel | Jan. 23, 1951 |
| 2,555,603 | Ogilvie | June 5, 1951 |
| 2,565,898 | Widmer et al. | Aug. 28, 1951 |
| 2,619,502 | Williams | Nov. 25, 1952 |
| 2,628,960 | Freyermuth | Feb. 17, 1953 |